US012189250B2

United States Patent
Zhang et al.

(10) Patent No.: US 12,189,250 B2
(45) Date of Patent: Jan. 7, 2025

(54) DISPLAY SUBSTRATE, DISPLAY PANEL AND DISPLAY APPARATUS

(71) Applicants: Wuhan BOE Optoelectronics Technology Co., Ltd., Hubei (CN); BOE Technology Group Co., Ltd., Beijing (CN)

(72) Inventors: Yiyi Zhang, Beijing (CN); Wei Wu, Beijing (CN); Yan Chen, Beijing (CN); Dang Zhang, Beijing (CN); Junfeng Dai, Beijing (CN); Xiang Liu, Beijing (CN); Yichen Zhou, Beijing (CN); Hao Zhang, Beijing (CN); Mingyu Xiao, Beijing (CN); Zizheng Liu, Beijing (CN); Yuan Tong, Beijing (CN); Qi Chen, Beijing (CN); Taohe Zhu, Beijing (CN)

(73) Assignees: Wuhan BOE Optoelectronics Technology Co., Ltd., Hubei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/918,647

(22) PCT Filed: Nov. 30, 2021

(86) PCT No.: PCT/CN2021/134534
§ 371 (c)(1),
(2) Date: Oct. 13, 2022

(87) PCT Pub. No.: WO2023/097485
PCT Pub. Date: Jun. 8, 2023

(65) Prior Publication Data
US 2024/0219789 A1     Jul. 4, 2024

(51) Int. Cl.
G02F 1/1343     (2006.01)
G02F 1/1345     (2006.01)
G02F 1/1362     (2006.01)

(52) U.S. Cl.
CPC .. *G02F 1/136286* (2013.01); *G02F 1/134363* (2013.01); *G02F 1/13452* (2013.01)

(58) Field of Classification Search
CPC .................................................. G02F 1/1343
See application file for complete search history.

(56) References Cited

U.S. PATENT DOCUMENTS

2013/0148049 A1*  6/2013  Abe ................ H01L 29/78651
                                                         257/72
2013/0292713 A1*  11/2013 Wu ....................... H01L 27/156
                                                         257/88
(Continued)

FOREIGN PATENT DOCUMENTS

CN      103135298 A      6/2013
CN      104103250 A     10/2014
(Continued)

*Primary Examiner* — Sang V Nguyen
(74) *Attorney, Agent, or Firm* — Nath, Goldberg & Meyer; Joshua B. Goldberg

(57) ABSTRACT

Embodiments of the present disclosure provide a display substrate having a display region and a frame region. The display substrate includes a plurality of display pixels and a plurality of dummy pixels arranged in an array; the display pixels are distributed in the display region; the dummy pixels are distributed in the frame region. Each display pixel includes a first pixel electrode and a first common electrode; and a first voltage difference exists between the first pixel electrode and the first common electrode. Each dummy pixel includes a second pixel electrode and a second common electrode; and a second voltage difference exists between the second pixel electrode and the second common electrode. A difference between the first voltage difference and the sec- (Continued)

ond voltage difference is less than a set value. Embodiments of the present disclosure further provides a display panel and a display apparatus.

17 Claims, 10 Drawing Sheets

(56) References Cited

U.S. PATENT DOCUMENTS

| | | | | |
|---|---|---|---|---|
| 2014/0307190 | A1* | 10/2014 | Tomikawa | G09G 3/3648 349/33 |
| 2020/0201468 | A1* | 6/2020 | Park | G06F 3/0412 |
| 2021/0391346 | A1* | 12/2021 | Kim | H10B 41/27 |
| 2022/0326558 | A1* | 10/2022 | Long | G02F 1/136286 |

FOREIGN PATENT DOCUMENTS

| | | | |
|---|---|---|---|
| CN | 108780257 A | 11/2018 | |
| CN | 107994054 B | 5/2020 | |
| CN | 111415610 B | 7/2021 | |
| CN | 108628020 B | 8/2021 | |
| JP | 2006276401 A | 10/2006 | |
| JP | 2010210734 A | 9/2010 | |
| KR | 20160067300 * | 6/2016 | G02F 1/1343 |
| KR | 20160067300 A | 6/2016 | |

* cited by examiner

DISPLAY SUBSTRATE, DISPLAY PANEL AND DISPLAY APPARATUS

This is a National Phase Application filed under 35 U.S.C. 371 as a national stage of PCT/CN2021/134534, filed Nov. 30, 2021, the content of which is hereby incorporated by reference in its entirety.

TECHNICAL FIELD

Embodiments of the present disclosure relates to the field of display technology, and specifically relates to a display substrate, a display panel, and a display apparatus.

BACKGROUND

At present, market consumers have increasingly stringent requirements on the image quality, transmittance and the like of display devices, which puts higher requirements on display technologies. The higher the resolution of the display device is, the finer the displayed image is, and the better the image quality is. In the current market, high-resolution products typically have a relatively small pixel pitch, so that there are too many TFT (thin film transistor) devices matched with hundreds of millions of sub-pixels, and more black matrixes appear in an effective display region, leading to a low transmittance of the display panel.

SUMMARY

Embodiments of the present disclosure provide a display substrate, a display panel, and a display apparatus.

In a first aspect, an embodiment of the present disclosure provides a display substrate having a display region and a frame region;
  the display substrate includes a plurality of display pixels and a plurality of dummy pixels; the display pixels are distributed in the display region; the dummy pixels are distributed in the frame region; and the plurality of display pixels and the plurality of dummy pixels are arranged in an array;
  each display pixel includes a first pixel electrode and a first common electrode; and a first voltage difference exists between the first pixel electrode and the first common electrode;
  each dummy pixel includes a second pixel electrode and a second common electrode; and a second voltage difference exists between the second pixel electrode and the second common electrode; and
  a difference between the first voltage difference and the second voltage difference is less than a set value.

In some implementations, the display substrate further includes at least two first data lines and a plurality of second data lines each extending in a column direction of the array:
  the dummy pixels include first type pixels;
  the first type pixels are in different columns from the display pixels;
  second pixel electrodes of the first type pixels in a same column are connected to a same one of the first data lines;
  first pixel electrodes of the display pixels in a same column are connected to a same one of the second data lines; and
  a data signal input to any one of the first data lines is the same as a data signal input to one of the second data lines adjacent thereto.

In some implementations, the dummy pixels further include second type pixels in a column where the display pixels are located; and
  for the second type pixels and the display pixels in a same column, second pixel electrodes of the second type pixels and the first pixel electrodes of the display pixels are connected to a same one of the second data lines.

In some implementations, the display substrate further includes a plurality of common voltage lines each extending in a row direction of the array;
  for the display pixels and the dummy pixels in a same row, first common electrodes of the display pixels and second common electrodes of the dummy pixels are connected to a same one of the common voltage lines;
  second common electrodes of the dummy pixels in a same row are connected to a same one of the common voltage lines; and
  a same common voltage signal is input to each of the plurality of common voltage lines.

In some implementations, the display substrate further includes a plurality of common voltage lines each extending in a row direction of the array:
  the first common electrodes of the display pixels in a same row are connected to a same one of the common voltage lines;
  the second common electrodes of the dummy pixels are suspended; and
  a same common voltage signal is input to each of the plurality of common voltage lines.

In some implementations, the display substrate further includes at least two first data lines, a plurality of second data lines, and a plurality of common voltage lines; wherein the first data lines and the second data lines each extend in a column direction of the array; the plurality of common voltage lines each extend in a row direction of the array:
  the dummy pixels include first type pixels and second type pixels;
  the first type pixels are in a different column from the display pixels; the second type pixels are in columns where the display pixels are located;
  second pixel electrodes of the first type pixels in a same column are connected to a same one of the first data lines that is connected to one of the common voltage lines;
  first pixel electrodes of the display pixels in a same column are connected to a same one of the second data lines;
  second pixel electrodes of the second type pixels in a same row are connected to a same one of the common voltage lines;
  first common electrodes of the display pixels in a same row are connected to a same one of the common voltage lines;
  a same common voltage signal is input to each of the plurality of common voltage lines; and
  the second common electrodes of the first type pixels and the second type pixels are suspended.

In some implementations, the display substrate further includes a common voltage bus located in the frame region and surrounding the display region; wherein
  a plurality of first access lines extend from a portion of the common voltage bus corresponding to a first side of the display substrate, and the plurality of first access lines are located in the frame region and each connected to one of the common voltage line adjacent thereto;

the first side of the display substrate is a side edge where extending ends of the first data lines and the second data lines are located; and the plurality of first access lines and the second data lines are alternately distributed at intervals.

In some implementations, a plurality of second access lines further extend from a portion of the common voltage bus corresponding to a second side of the display substrate, and the plurality of second access lines are located in the frame region and each connected to one of the common voltage lines adjacent thereto;

the second side of the display substrate, opposite to the first side, is a side edge where starting ends of the first data lines and the second data lines are located; and the plurality of second access lines and the second data lines are alternately distributed at intervals.

In some implementations, the display substrate further includes a plurality of flexible circuit boards; wherein each flexible circuit board is provided with a data driving circuit connecting the starting ends of the first data lines and the second data lines; and the plurality of second access lines are each located in a spacing region between every two adjacent flexible circuit boards.

In some implementations, a line width of each first access line is less than or equal to a line width of each second data line; and a line width of each second access line is less than or equal to the line width of each second data line.

In some implementations, each first access line has a straight line shape or a broken line shape; and each second access line includes a straight line shape or a broken line shape.

In some implementations, an opening area of each dummy pixel is ½, ⅔, or ⅘ times an opening area of each display pixel.

In some implementations, the display substrate further includes a third side and a fourth side opposite to each other and each extending in the column direction of the array;

the first side and the second side each extend in the row direction of the array;

the third side and the fourth side are connected to the first side and the second side respectively to form an edge of the display substrate; and the dummy pixels are sequentially arranged for at least one circle along the edge of the display substrate.

In some implementations, the display substrate further includes a base, the first common electrode and the first pixel electrode are located in different layers above the base and mutually overlapped;

the second common electrode and the second pixel electrode are located in different layers above the base and mutually overlapped;

the first common electrode and the second common electrode are located in a same layer; the first pixel electrode and the second pixel electrode are located in a same layer;

the first pixel electrode and the second pixel electrode are farther away from the base than the first common electrode and the second common electrode; and the first pixel electrode and the second pixel electrode are both slit electrodes; and the first common electrode and the second common electrode are both plate electrodes.

In some implementations, the plurality of common voltage lines, the common voltage bus, the plurality of first access lines, and the plurality of second access lines are in a same layer;

the plurality of common voltage lines each extend to be connected to the common voltage bus at both ends thereof;

the first data lines and the second data lines are located in a same layer;

the common voltage lines and the second data lines are located in different layers, and an insulation layer is provided therebetween;

the display substrate further includes a plurality of common voltage jumper wires uniformly distributed in the display region; and the plurality of common voltage jumper wires and the second data lines are located in a same layer and parallel to each other; and the plurality of common voltage jumper wires each are connects any two of the common voltage lines through with each other via holes in the insulation layer.

In a second aspect, an embodiment of the present disclosure further provides a display panel, including the display substrate as described above.

In some implementations, the display panel further includes an opposite substrate, which is aligned and assembled with the display substrate to form a cell gap therebetween, wherein the cell gap is filled with negative liquid crystals.

In a third aspect, an embodiment of the present disclosure further provides a display apparatus, including the display panel as described above.

BRIEF DESCRIPTION OF DRAWINGS

Accompanying drawings are provided for further understanding of the embodiments of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art by describing in detail exemplary embodiments thereof with reference to the attached drawings, in which.

Figures 1, 2:
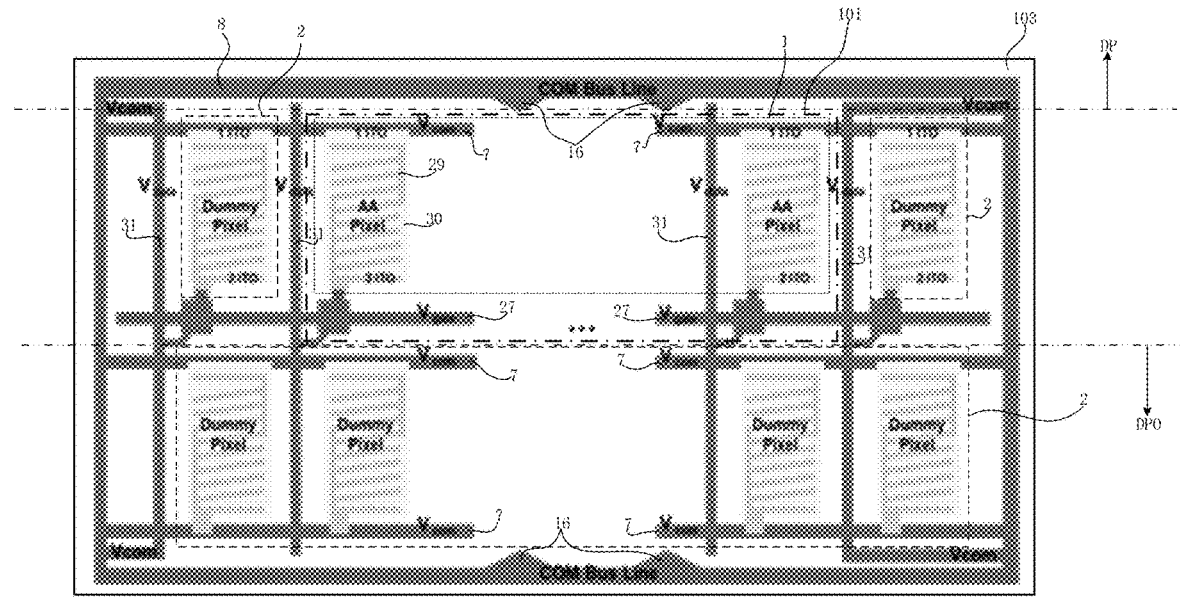
FIG. 1 is a schematic diagram showing display pixels and dummy pixels in a liquid crystal display panel connected to driving signals in the related art.
FIG. 2 is a schematic diagram of black stains appearing at a periphery of a liquid crystal display panel.

The reference signs therein are as listed below.

1. display pixel; 11. first pixel electrode; 12. first common electrode; 2. dummy pixel; 21. second pixel electrode; 22. second common electrode; 110. branch electrode; 111. branch electrode set; 112. first electrode; 113. second electrode; 201. first type pixel; 202. second type pixel; 101. display region; 102. frame region; 103. non-effective display region; 3. base; 4. first insulation layer; 5. first data line; 6. second data line; 7. common voltage line; 8. common voltage bus; 9. first access line; 10. second access line; 13. flexible circuit board; 14. data driving circuit; 15. common voltage jumper wire; 16. common voltage introduction point; 17. black matrix; 18. gate; 19. gate insulation layer; 20. active layer; 23. second insulation layer; 24. source; 25. drain; 26. third insulation layer; 27. scanning line; 28. fourth insulation layer; 29. pixel electrode; 30. common electrode; 31. data line; 32. black line stain; and 33. black spot stain.

DETAIL DESCRIPTION OF EMBODIMENTS

In order to make those skilled in the art better understand the technical solutions in the embodiments of the present disclosure, a display substrate, a display panel and a display apparatus provided in the embodiments of the present disclosure will be described in further detail below with reference to the accompanying drawings and specific implementations.

The embodiments of the present disclosure will be described more sufficiently below with reference to the accompanying drawings, which may be embodied in different forms and should not be construed as being limited to the embodiments set forth herein. Rather, these embodiments are provided so that the present disclosure will be thorough and complete, and will fully convey the scope of the present disclosure to those skilled in the art.

The embodiments of the present disclosure are not limited to the embodiments shown in the drawings, but further include modifications of configurations formed based on a manufacturing process. Thus, the regions illustrated in the figures have schematic properties, and the shapes of the regions shown in the figures illustrate specific shapes of regions, but are not intended to be limitative.

In the related art, there is a difference in uniformities of film thicknesses of a peripheral non-effective display region and a central effective display region of a liquid crystal display panel. In other words, in the effective display region, the film thickness is relatively uniform, while in the peripheral non-effective display region, the film thickness is not uniform since some film layers are missing after preparation and cause severe film step. As a result, a display pattern at a border between the effective display region and the non-effective display region tends to be non-uniform, causing poor display (i.e., display Mura, for example, dark fringes are displayed at the periphery) at a periphery of the effective display region (i.e., display Mura, for example, dark fringes are displayed at the periphery of the effective display region).

In order to avoid the poor display at the periphery of the effective display region, the liquid crystal display panel is usually provided with dummy pixels at the periphery of the effective display region. The dummy pixels have a same film layer structure as display pixels in the effective display region, and can improve the film step at the periphery of the effective display region, so that the display patterns at the border between the effective display region and the non-effective display region tend to be uniform, and the display effect is improved.

Referring to FIG. 1, a schematic diagram showing display pixels 1 (AA Pixels) and dummy pixels 2 in a liquid crystal display panel connected to driving signals in the related art is shown. In the liquid crystal display panel, in order to ensure that no light is leaked from the dummy pixels 2 in the peripheral non-effective display region 103 of the liquid crystal display panel during display, a data signal voltage input to a pixel electrode 29 of each dummy pixel 2 in the peripheral non-effective display region 103 is typically set to a common voltage (i.e., Vcom), and the common voltage (i.e., Vcom) is also input to a common electrode 30 of the dummy pixel 2, to ensure that liquid crystals in the non-effective display region 103 are not deflected and remain a black state. In contrast, a data signal voltage input to a pixel electrode 29 (2ITO) of each display pixel 1 in the effective display region 101 is different from a common voltage input to a common electrode 30 (1ITO) of the display pixel 1, so that the liquid crystals can be deflected under the effect of an electric field formed between the pixel electrode 29 and the common electrode 30 of the display pixel 1, thereby implementing effective display of the display pixel 1.

Referring to FIG. 1, a normal data signal voltage Vdata is input to the pixel electrode 29 of each display pixel 1 in the effective display region 101; the common voltage signal Vcom is input to the pixel electrode 29 of each dummy pixel 2 in the non-effective display region 103 (for example, the common voltage Vcom is input to the dummy pixel 2 by connecting a data line 31 connected to the pixel electrode 29 of the dummy pixel 2 to a common voltage bus line 8 in the non-effective display region 103); and the common voltage Vcom is input to the common electrodes 30 of both the display pixel 1 and the dummy pixel 2. Normally, the common voltage Vcom is a constant voltage, the pixel electrode 29 and the common electrode 30 of the dummy pixel 2 have a same voltage signal applied thereon, and the electric field formed between the pixel electrode 29 and the common electrode 30 will not cause the liquid crystals to deflect. For a high-resolution product, the transmittance of the display panel is improved by using negative liquid crystals. When the liquid crystal display panel uses negative liquid crystals, the dummy pixels 2 appears black, and in addition, the non-effective display region 103 is shielded by a black matrix, so the dummy pixels 2 will not affect the display. The data signal voltage Vdata on the pixel electrode 29 of each display pixel 1 in the effective display region 101 changes with the display image, and an electric field capable of deflecting the liquid crystals is formed between the pixel electrode 29 and the common electrode 30 of the display pixel 1 due to a voltage difference between the pixel electrode 29 and the common electrode 30, thereby implementing normal display of the display pixel 1.

Such a difference in the driving signal between the display pixel 1 and the dummy pixel 2 causes a voltage difference (which is a voltage difference causing the liquid crystals to deflect) therebetween, which causes a local strong electric field to be generated when the liquid crystal display panel is subjected to a high temperature reliability experiment, and the local strong electric field is more likely to attract ionic impurities in the display panel, and thus causes aggregation of the ionic impurities and abnormal deflection of the liquid crystals, leading to a high temperature black line stain 32 (refer to FIG. 2, which is a schematic diagram of black stains in a periphery region of the liquid crystal display panel). Especially for a display panel being a high-resolution product adopting negative liquid crystals, since there are lots of negative liquid crystal high-polarity monomers and the polarity is significant, more impurity ions and free radicals tends to be generated under long-term high-temperature and high-brightness backlight irradiation. Further, the ions tend to move faster at a high temperature, and can be easily gathered in a short time under the action of an electric field (especially a non-uniform electric field), causing the liquid crystal to deflect abnormally, and thus causing defects such as residual images or high-temperature black stains. As shown in FIG. 2, two rows of display pixels at the periphery region of the liquid crystal display panel are blackened, and serious black line stains 32 appear.

Figure 3:
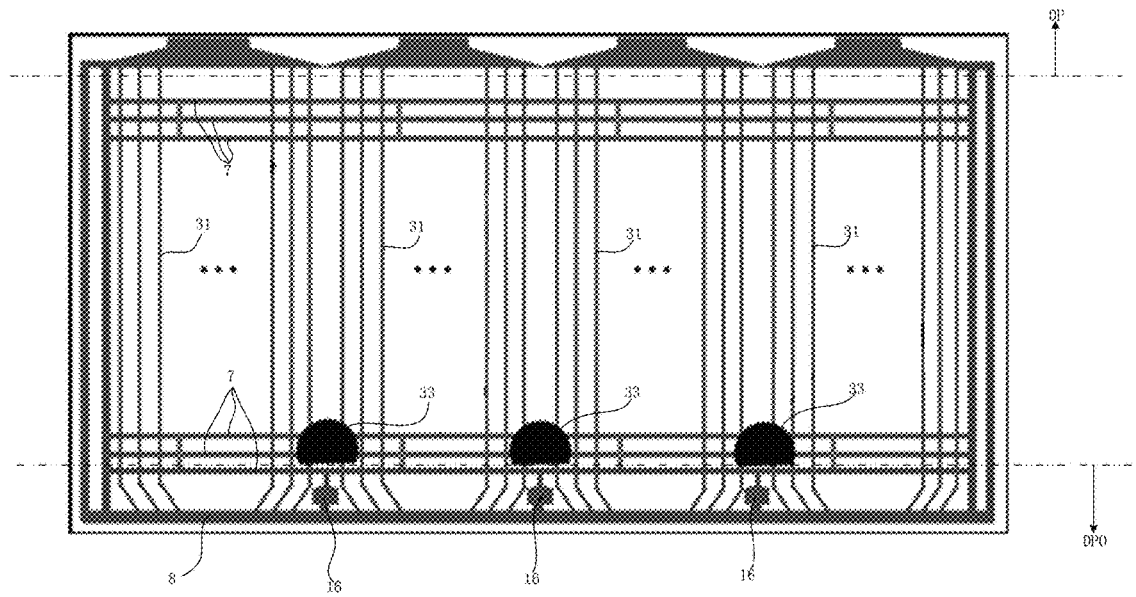
FIG. 3 is a schematic diagram showing positions with local black spot stains at a periphery of a liquid crystal display panel.

In addition, FIG. 3 is a schematic diagram showing positions with local black spot stains at the periphery region of the liquid crystal display panel. The liquid crystal display panel is provided with a binding side edge DP for flexible circuit boards, on which a plurality of flexible circuit boards are distributed at equal intervals. Data lines 31 are led out from a data driver chip on each flexible circuit board, and extend to an opposite side edge DPO opposite to the binding side edge DP to provide data driving signal voltages Vdata for the display pixels 1 (the transverse scanning lines 27 are configured to provide scanning signals Vgate for the display pixels 1). A common voltage bus line (COM Bus Line) 8 in the peripheral non-effective display region 103 of the liquid crystal display panel introduces the common voltage signal Vcom to common voltage lines 7 in the effective display region 101 through multiple pairs of common voltage introduction points 16 provided in pairs at the binding side edge DP and the opposite side edge DPO, to supply the common voltage signal Vcom to the common electrodes 30 of the display pixels 1 distributed in the effective display region 101. At the binding side edge DP of the liquid crystal display panel, a plurality of common voltage introduction points 16 are each provided in a spacing region between two adjacent flexible circuit boards, and the common voltage introduction points 16 at the opposite side edge DPO are distributed in one-to-one correspondence with the common voltage introduction points 16 at the binding side edge DP. Since the number of the common voltage introduction points 16 provided at the binding side edge DP and the opposite side edge DPO is small, and each common voltage introduction point 16 is a relatively wide block electrode, the liquid crystal display panel has a relatively strong local electric field at the position of each common voltage introduction point 16, and in a high-temperature reliability experiment, the relatively strong electric field will attract ionic impurities in the display panel, and cause aggregation of ionic impurities. As a result, the liquid crystal display panel has blackened display pixels at positions corresponding to the relatively strong electric field, and black spot stains 33 appear at the binding side edge and the opposite side edge (see FIG. 2).

Figure 4:
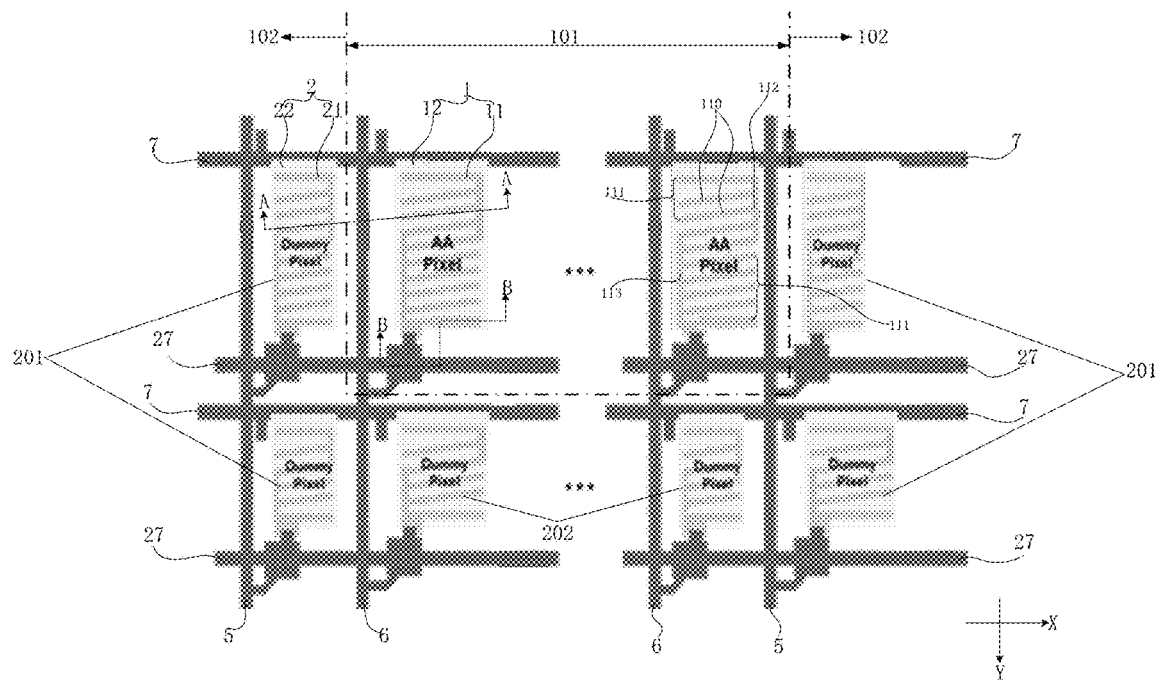
FIG. 4 is a top view showing connection between pixels and circuits for the pixels of a display substrate according to an embodiment of the present disclosure.

In view of the problem of black stains easily generated at the periphery region of the liquid crystal display panel, an embodiment of the present disclosure provides a display substrate. Referring to FIG. 4, a top view showing connection between pixels and circuits for the pixels of a display substrate according to an embodiment of the present disclosure is shown. The display substrate has a display region 101 and a frame region 102. The display substrate includes a plurality of display pixels 1 (AA Pixels) and a plurality of dummy pixels 2 (Dummy Pixels). The display pixels 1 are distributed in the display region 101. The dummy pixels 2 are distributed in the frame region 102. The plurality of display pixels 1 and the plurality of dummy pixels 2 are arranged in an array. Each display pixel 1 includes a first pixel electrode 11 and a first common electrode 12; and a first voltage difference is formed between the first pixel electrode 11 and the first common electrode 12. Each dummy pixel 2 includes a second pixel electrode 21 and a second common electrode 22; and a second voltage difference is formed between the second pixel electrode 21 and the second common electrode 22. A difference between the first voltage difference and the second voltage difference is less than a set value.

In some implementations, the difference between the first voltage difference and the second voltage difference is 0, which means that a same voltage is applied to the first pixel electrode 11 and the second pixel electrode 21, and a same voltage is applied to the first common electrode 12 and the second common electrode 22.

In some implementations, different voltages may be applied to the first pixel electrode 11 and the second pixel electrode 21, respectively, and different voltages may be applied to the first common electrode 12 and the second common electrode 22, respectively. However, the difference between the first voltage difference and the second voltage difference is 0 or close to 0. For example, optionally, the difference between the first voltage difference and the second voltage difference is 0.2V, 0.6V, 0.8V, 1V, and the like, which is not limited herein.

In some implementations, the display substrate may be an array substrate in a liquid crystal display panel.

By setting the difference between the first voltage difference and the second voltage difference to be less than the set value, a voltage difference between the display pixel 1 and the dummy pixel 2 is prevented, and thus the local strong electric field will not occur when the display substrate is subjected to the high temperature reliability experiment. Therefore, the aggregation of ionic impurities caused by the local strong electric field attracting ionic impurities in the display substrate is avoided, the high temperature line stains caused by abnormal deflection of liquid crystals at positions where the ionic impurities in the display substrate are gathered are prevented, and the display effect of the display substrate is improved.

Figure 5:
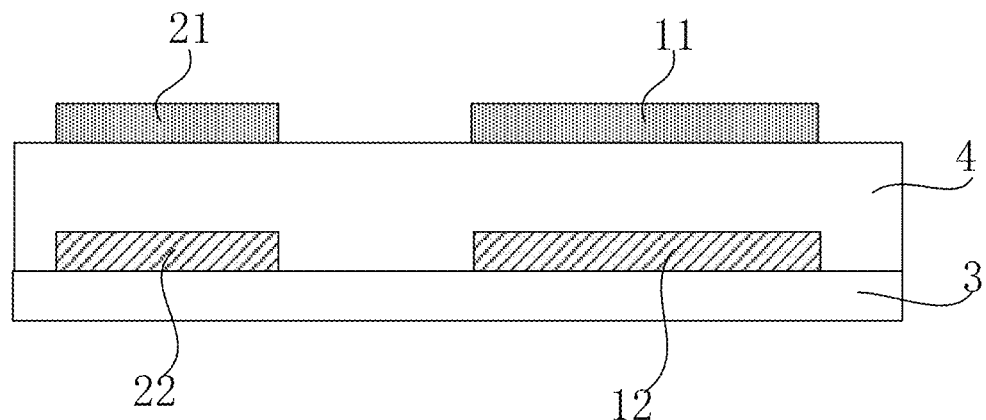
FIG. 5 is a structural sectional view of the display substrate in FIG. 4 taken along line AA.

In some implementations, referring to FIG. 5, which is a structural sectional view of the display substrate in FIG. 4 is taken along line AA. The display substrate further includes a base 3. The first common electrode 12 and the first pixel electrode 11 are located in different layers above the base 3 and mutually overlapped. The second common electrode 22 and the second pixel electrode 21 are located in different layers above the base 3 and mutually overlapped. The first common electrode 12 and the second common electrode 22 are located in a same layer. The first pixel electrode 11 and the second pixel electrode 21 are located in a same layer. The first pixel electrode 11 and the second pixel electrode 21 are farther away from the base 3 than the first common electrode 12 and the second common electrode 22. The first pixel electrode 11 and the second pixel electrode 21 are both slit electrodes; and the first common electrode 12 and the second common electrode 22 are both plate electrodes. In this embodiment, the first pixel electrode 11 and the second pixel electrode 21 each include a plurality of branch electrodes 110, and at least two branch electrode sets 111. First branch electrode sets 111 are connected together via a first electrode 112 extending along a direction in which a second data line 6 extends, the other branch electrode sets 111 are connected together via a second electrode 113 extending along the direction in which the second data line 6 extends. In a pixel electrode region, the first electrode 112 and the second electrode 113 are located on two opposite sides of the pixel electrode region, the branch electrode sets 111 connected with the first electrode 112 are not connected together at the side opposite to the first electrode 112, and the branch electrode sets 111 connected with the second electrode 113 are not connected together at the side opposite to the second electrode 113. The pixel electrode thus designed can improve the color shift of display, and the dummy pixel 2 and the display pixel 1 in the present disclosure both adopt such pixel electrode structure. Apparently, when the pixel electrode is disposed between the common electrode and the base 3, the pixel electrode may adopt a plate-like structure, and the common electrode is designed into a shape of the pixel electrode shown in FIG. 4, which is not limited herein. Optionally, the display substrate in this embodiment is an advanced super dimension switch (ADS) type. A first insulation layer 4 is provided between the first common electrode 12 and the second common electrode 22 in the same layer and the first pixel electrode 11 and the second pixel electrode 21 in the same layer.

In some implementations, the display substrate may be further configured such that the first common electrode and the second common electrode are farther from the base than the first pixel electrode and the second pixel electrode; the first common electrode and the second common electrode are both slit electrodes; and the first pixel electrode and the second pixel electrode are both plate electrodes.

In some implementations, the display substrate may be provided with merely the first pixel electrode and the second pixel electrode, while the first common electrode and the second common electrode are disposed on an opposite substrate to be aligned and assembled with the display substrate.

In some implementations, the first common electrodes 12 of the plurality of display pixels 1 are separately provided; and the first pixel electrode 11 and the first common electrode 12 of each display pixel 1 are overlapped with each other to form an electric field that causes the liquid crystals to deflect. The second common electrodes 22 of the plurality of dummy pixels 2 are separately provided; and the second pixel electrode 21 and the second common electrode 22 of each dummy pixel 2 are overlapped with each other to form an electric field that causes the liquid crystals to deflect.

In some implementations, referring to FIG. 4, the display substrate further includes at least two first data lines 5 and a plurality of second data lines 6 each extending in a column direction Y of the array. The dummy pixels 2 include first type pixels 201. The first type pixels 201 are in a different column from the display pixels 1. Second pixel electrodes 21 of a same column of first type pixels 201 are connected to a same one of the first data lines 5. The first pixel electrodes 11 of a same column of display pixels 1 are connected to a same one of the second data lines 6. A data signal input to any one of the first data lines 5 is the same as a data signal input to a second data line 6 adjacent to the first data line 5.

The first data lines 5 and the second data lines 6 are located in a same layer and parallel to each other.

In some implementations, the display substrate further includes a plurality of common voltage lines 7 each extending in a row direction X of the array. For the display pixels 1 and the dummy pixels 2 in a same row, the first common electrodes 12 of the display pixels 1 and the second common electrodes 22 of the dummy pixels 2 are connected to a same one of the common voltage lines 7. It should be noted that the connection between the common voltage line and the common electrode may be implemented by providing the common voltage line and the common electrode in a same layer and lapping them to form an electrical connection, as shown in FIG. 4, or by providing the common voltage line and the common electrode in a different layer and electrically connecting them through a via hole, which is not limited herein. The second common electrodes 22 of a same row of dummy pixels 2 are connected to a same one of the common voltage lines 7. A same common voltage signal is input to each of the plurality of common voltage lines 7. Namely, a same common voltage signal is input to the first common electrode 12 of the display pixel 1 and the second common electrode 22 of the dummy pixel 2.

The plurality of common voltage lines 7 are located in a same layer and parallel to each other. The first common electrode 12 of each display pixel 1 and the second common electrode 22 of each dummy pixel 2 are separately provided and respectively connected to the common voltage lines 7. The common voltage signals are separately input to each first common electrode 12 and each second common electrode 22 through the common voltage lines 7, respectively. When the common voltage signals are separately input to each first common electrode 12 and each second common electrode 22 through the common voltage lines 7, respectively, unlike the case as shown in FIG. 4 where the common voltage lines 7 for the dummy pixels 2 and the display pixels 1 in the same row are connected together, for the display pixels 1 and the dummy pixels 2 in the same row, the common voltage line 7 corresponding to the display pixels 1 and the common voltage line 7 corresponding to the dummy pixels 2 are disconnected and insulated from each other, and the common voltage line 7 connected to the display pixels 1 and the common voltage line 7 connected to the dummy pixels 2 are controlled through signals, respectively.

In this embodiment, the display substrate includes two first data lines 5. The two first data lines 5 are respectively located at left and right sides of the array of display pixels 1 in the display region 101 along the column direction Y, and respectively connected to the second pixel electrodes 21 of each column of first type pixels 201 at the left and right sides of the array of display pixels 1 in the display region 101 along the column direction Y. The data signal input to each first data line 5 is the same as the data signal input to a second data line 6 closest to the first data line. That is, when the displayed image is changed, the data signal input to each first data line 5 and the data signal input to the second data line 6 closest to each first data line are changed simultaneously. For example, a voltage of the data signal includes, but is not limited to, 0V to 16.5V, and the difference between the first voltage difference of the display pixels 1 and the second voltage difference of the first type pixels 201 is always 0 or close to 0. In this manner, a voltage difference can be prevented from occurring between the display pixel 1 and the dummy pixel 2 at the left and right edges of the array of display pixels 1 in column direction Y in the display region 101, thereby preventing a strong electric field from being generated at the left and right edges of the array of display pixels 1 along the column direction Y in the display region 101 when the display substrate is subjected to the high temperature reliability experiment, avoiding aggregation of ionic impurities caused by the strong electric field at the left and right edges of the array of display pixels 1 along the column direction Y in the display region 101 attracting ionic impurities in the display substrate, and fundamentally solving the high temperature line stains caused by abnormal deflection of liquid crystals at the positions where the ionic impurities are gathered in the display substrate.

In some implementations, referring to FIG. 4, the dummy pixels 2 further include second type pixels 202 in columns where the display pixels 1 are located. For the second type pixels 202 and the display pixels 1 in a same column, the second pixel electrodes 21 of the second type pixels 202 and the first pixel electrodes 11 of the display pixels 1 are connected to a same one of the second data lines 6. That is, for the second type pixels 202 and the display pixels in a same column, a same data signal is input to the second pixel electrodes 21 of the second type pixels 202 and the first pixel electrodes 11 of display pixels 1. That is, the difference between the first voltage difference of the display pixels 1 and the second voltage difference of the second type pixels 202 is always 0. In this manner, a voltage difference can be prevented from occurring between the display pixel 1 and the dummy pixel 2 at upper and lower edges of the array of display pixels 1 along the row direction X in the display region 101, thereby preventing a strong electric field from being generated at the upper and lower edges of the array of display pixels 1 along the row direction X in the display region 101 when the display substrate is subjected to the high temperature reliability experiment, avoiding gathering of ionic impurities caused by the strong electric field at the upper and lower edges of the array of display pixels 1 along the row direction X in the display region 101 attracting ionic impurities in the display substrate, and fundamentally solving the high temperature line stains caused by abnormal deflection of liquid crystals at positions where the ionic impurities are gathered in the display substrate.

In the embodiment of FIG. 4, an opening area of each dummy pixel 2 is ½, ⅔, or ⅘ of an opening area of each display pixel 1. In other words, the opening area of the dummy pixel 2 is smaller than that of the display pixel 1. When a data signal is input to the second pixel electrode 21 of the dummy pixel 2 and a common voltage signal is input to the second common electrode 22 of the dummy pixel 2, the dummy pixel 2 can deflect the liquid crystals under the action of the electric field formed by the second pixel electrode 21 and the second common electrode 22, thereby implementing light-transmitting display of the dummy pixel 2. However, the dummy pixel 2 is located in the frame region 102 and does not need to perform light-transmitting display. In order to prevent light leakage in the frame region 102 during display of the dummy pixel 2, the opening area of the dummy pixel 2 is designed to be smaller than that of the display pixel 1. In addition, a black matrix on the opposite substrate can further cover the frame region 102 of the display substrate, so that light transmitted from the dummy pixel 2 can be better shielded, and light leakage in the frame region 102 of the display substrate can be avoided.

Figure 6:
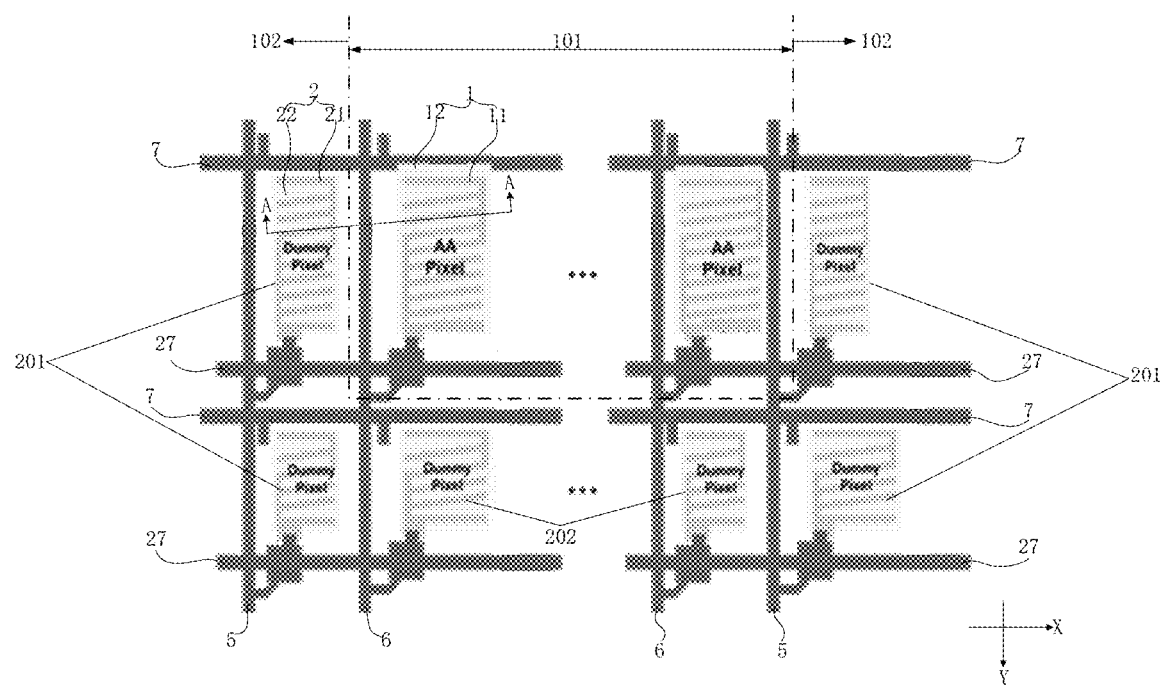
FIG. 6 is a top view showing connection between pixels and circuits for the pixels of another display substrate according to an embodiment of the present disclosure.

In some implementations, referring to FIG. 6, a top view showing connection between pixels and circuits for the pixels of another display substrate according to an embodiment of the present disclosure is shown. The display substrate further includes a plurality of common voltage lines 7 each extending in a row direction X of the array. The first common electrodes 12 of the display pixels 1 in a same row are connected to a same one of the common voltage lines 7; the second common electrodes 22 of the dummy pixels 2 are suspended; and a same common voltage signal is input to each of the plurality of common voltage lines 7.

The plurality of common voltage lines 7 are located in a same layer and parallel to each other. No voltage signal is input to the second common electrodes 22 of the dummy pixels 2. That is, a voltage signal at 0V is input to the second common electrodes 22. In this case, the second voltage difference formed between the second pixel electrode 21 and the second common electrode 22 of each dummy pixel 2 is a data signal voltage (i.e., a voltage of the data signal −0); and the first voltage difference formed between the first pixel electrode 11 and the first common electrode 12 of the display pixel 1 adjacent to the dummy pixel 2 is a voltage difference between the data signal and the common voltage signal. Since the same data signal is input to the second pixel electrode 21 of the dummy pixel 2 and the first pixel electrode 11 of the display pixel 1 closest to the dummy pixel 2, compared with the solution of the related art in which the first voltage difference is a voltage difference between the data signal and the common voltage signal, and the second voltage difference is 0, the difference between the first voltage difference and the second voltage difference is significantly reduced in the present embodiment. Therefore, the technical solution of the present embodiment can also reduce the voltage difference between the display pixels 1 and the dummy pixels 2 at a peripheral edge of the array of display pixels 1 in the display region 101, and a phenomenon that the strong electric field is generated at the peripheral edge of the array of display pixels 1 in the display region 101 can be improved or avoided when the display substrate is subjected to the high temperature reliability experiment. Therefore, the gathering of ionic impurities caused by the strong electric field at the peripheral edge of the array of display pixels 1 in the display region 101 attracting ionic impurities in the display substrate is improved or avoided, and the high temperature line stains caused by abnormal deflection of liquid crystals at positions where the ionic impurities are gathered in the display substrate is fundamentally improved or avoided.

Figure 7:
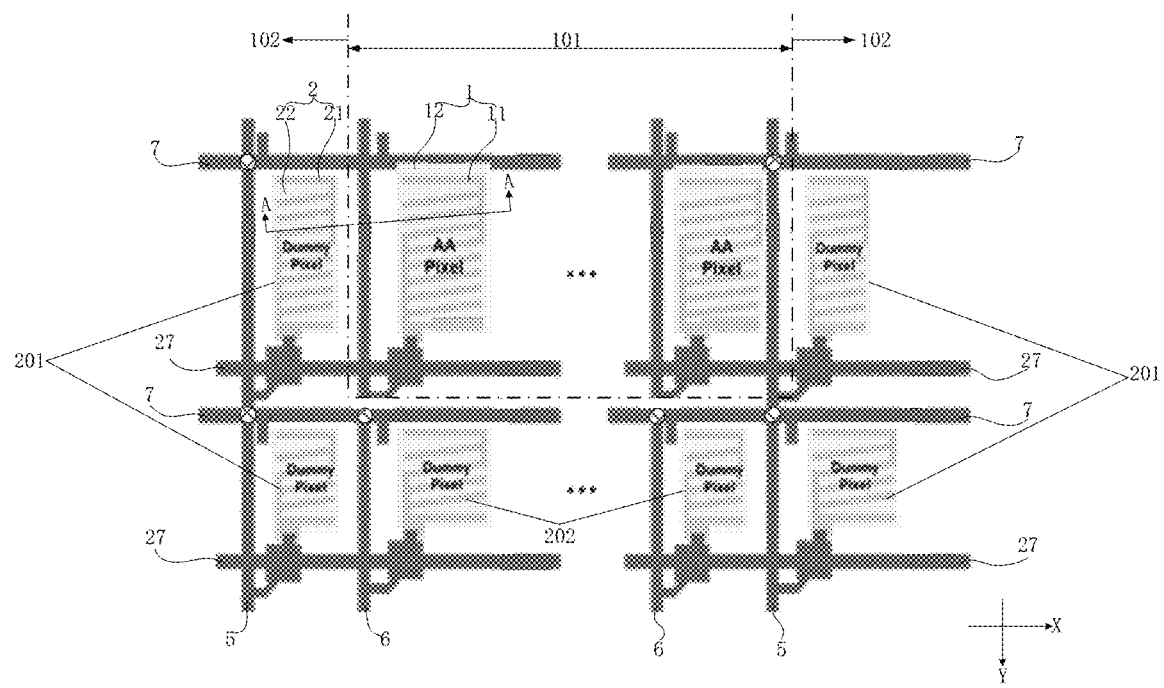
FIG. 7 is a top view showing connection between pixels and circuits for the pixels of yet another display substrate according to an embodiment of the present disclosure.

In some implementations, referring to FIG. 7, a top view showing connection between pixels and circuits for the pixels of yet another display substrate according to an embodiment of the present disclosure is shown. The display substrate includes at least two first data lines 5, a plurality of second data lines 6, and a plurality of common voltage lines 7. The first data lines 5 and the second data lines 6 each extend in a column direction Y of the array; and the plurality of common voltage lines 7 each extend in a row direction X of the array. The dummy pixels 2 include first type pixels 201 and second type pixels 202. The first type pixels 201 are located in a different column from the display pixels 1. The second type pixels 202 are located in columns where the display pixels 1 are located. The second pixel electrodes 21 of the first type pixels 201 in a same column are connected to a same one of the first data lines 5 that is connected to the common voltage lines 7. The first pixel electrodes 11 of the display pixels 1 in a same column are connected to a same one of the second data lines 6. The second pixel electrodes 21 of the second type pixels 202 in a same row are connected to a same one of the common voltage lines 7. The first common electrodes 12 of the display pixels 1 in a same row are connected to a same one of the common voltage lines 7. A same common voltage signal is input to each of the plurality of common voltage lines 7. The second common electrodes 22 of the first type pixels 201 and the second type pixels 202 are suspended.

The first data lines 5 and the second data lines 6 are located in a same layer and parallel to each other. The plurality of common voltage lines 7 are located in a same layer and parallel to each other. A common voltage signal is input to the second pixel electrodes 21 of the first type pixels 201 and the second type pixels 202, respectively, and a voltage signal at 0V is input to the second common electrodes 22 of both the first type pixels 201 and the second type pixels 202. Therefore, the second voltage difference formed between the second pixel electrode 21 and the second common electrode 22 of each dummy pixel 2 is a voltage of the common voltage signal (i.e., the voltage of the common voltage signal −0). The first voltage difference formed between the first pixel electrode 11 and the first common electrode 12 of the display pixel 1 adjacent to the dummy pixel 2 is a difference between the voltages of the data signal and the common voltage signal. Compared with the solution in the related art in which the first voltage difference is a difference between the voltages of the data signal and the common voltage signal, and the second voltage difference is 0, the difference between the first voltage difference and the second voltage difference is significantly reduced in the present embodiment. In other words, the technical solution of the present embodiment reduces the voltage difference between the display pixels 1 and the dummy pixels 2 at peripheral edges of the array of display pixels 1 in the display region 101, and the strong electric field generated at the peripheral edges of the array of display pixels 1 in the display region 101 can be improved or avoided when the display substrate is subjected to the high temperature reliability experiment. Therefore, the gathering of ionic impurities caused by the strong electric field at the peripheral edges of the array of display pixels 1 in the display region 101 attracting ionic impurities in the display substrate is improved or avoided, and the high temperature line stains caused by abnormal deflection of liquid crystals at positions where the ionic impurities are gathered in the display substrate is fundamentally improved or avoided.

In the embodiment shown in FIGS. 6 and 7, the dummy pixel 2 has a opening area the same as that of the display pixel 1. In the embodiment of the display substrate shown in FIGS. 6 and 7, either the data signal is input to the second pixel electrode 21 of the dummy pixel 2, and the second common electrode 22 is suspended; or the common voltage signal is input to the second pixel electrode 21 of the dummy pixel 2, and the second common electrode 22 is suspended. In either case, the dummy pixel 2 will not generate an electric field that causes the liquid crystals to deflect, and the dummy pixel 2 does not transmit light for display. Therefore, light leakage will not occur in the frame region 102 of the display substrate due to provision of the dummy pixel 2, and the dummy pixel 2 may have a same opening area as the display pixel 1.

Figure 8:
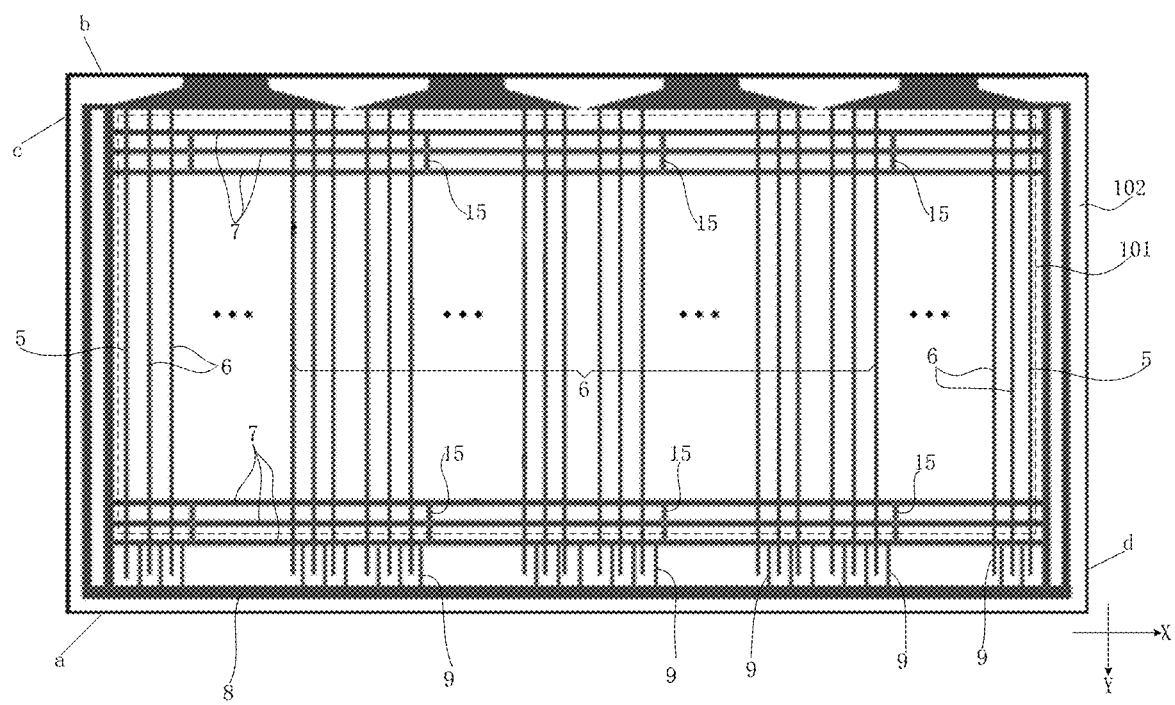
FIG. 8 is a top view of a circuit wiring in a display substrate according to an embodiment of the present disclosure.

In some implementations, referring to FIG. 8, a top view of a circuit wiring in a display substrate according to an embodiment of the present disclosure is shown. The display substrate further includes a common voltage bus 8 located in the frame region 102 and surrounding the display region 101. A plurality of first access lines 9 extend from a portion of the common voltage bus 8 corresponding to a first side a of the display substrate, and the plurality of first access lines 9 are located in the frame region 102 and each connected to a common voltage line 7 adjacent thereto. The first side a of the display substrate is a side edge where extending ends of the first data lines 5 and the second data lines 6 are located. The plurality of first access lines 9 and the second data lines 6 are alternately distributed at intervals. It should be noted that the "alternately distributed at intervals" here may mean that one second data line 6 is provided every other first access line 9, or that a plurality of second data lines 6 are provided every a plurality of first access lines 9, or that one second data line 6 is provided every a plurality of first access lines 9, which is not limited here.

The common voltage bus 8 is located in the same layer as the plurality of first access lines 9. The common voltage bus 8 is located in the same layer as and connected to the plurality of common voltage lines 7, and configured to provide a common voltage signal for the plurality of common voltage lines 7. The plurality of first access lines 9 and the second data lines 6 are parallel to each other and equally spaced.

In some implementations, a line width of each first access line 9 is less than or equal to a line width of each second data line 6.

In some implementations, the number of the first access lines 9 is 1/N times the number of the second data lines 6, where N=1, 2, 3 . . . 12, and N is an integer.

In the present embodiment, as described above, by setting introduction points where the common voltage bus 8 introduces the common voltage signal to the common voltage lines 7 as the plurality of first access lines 9 with a thinner line width and uniformly arranged in a direction in which the second data lines 6 are arranged, compared with the introduction points where the common voltage bus 8 introduces the common voltage signal to the common voltage lines 7 in the related art, the number of the first access lines 9 in the present embodiment is much greater than the number of introduction points in the related art. A width of each first access line 9 in the embodiment is much smaller than a width of the introduction point in the related art, therefore, a strength of the local electric field at connection points of the first access lines 9 and the common voltage lines 7 is greatly reduced. In addition, since the first access lines 9 and the second data lines 6 are uniformly and alternatively distributed at equal intervals, and the difference between the second voltage difference of the dummy pixel 2 and the first voltage difference of the display pixel 1 is 0 or close to 0, the phenomenon in which the local electric field at the connection points of the first access lines 9 and the common voltage lines 7 attracting ionic impurities in the display panel and causing gathering of the ionic impurities is greatly improved or avoided, so that the phenomenon in which the display pixels 1 at the connection points of the first access lines 9 and the common voltage lines 7 are blackened is improved or eliminated, the defect of black spot stains at the connection points of the first access lines 9 and the common voltage lines 7 is thus improved or avoided, and the display effect of the display substrate is improved.

Figure 9:
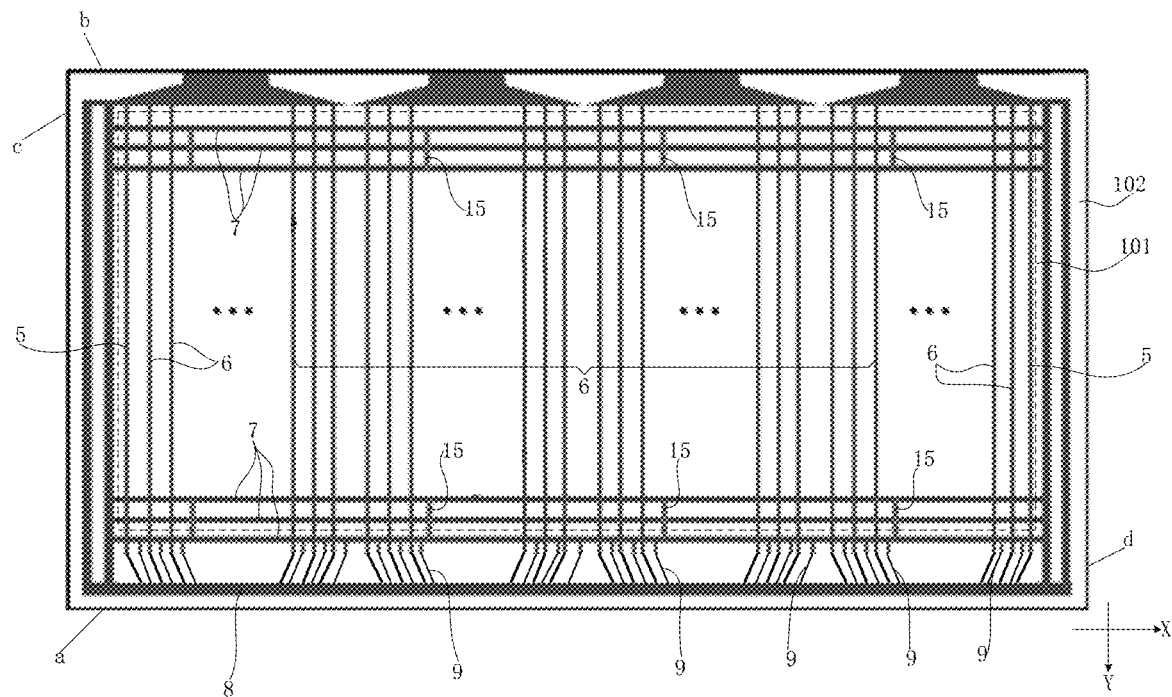
FIG. 9 is a top view of another circuit wiring of a display substrate according to an embodiment of the present disclosure.

In some implementations, each first access line 9 has a straight line shape (FIG. 8) or a broken line shape (FIG. 9, which shows a top view of another circuit wiring in a display substrate according to an embodiment of the present disclosure).

In order to ensure that the plurality of second data lines 6 has a same wiring resistance (i.e., the second data line 6 have a same wiring length), the extending end of each second data line 6 forms a wiring in a broken line shape. Accordingly, each first access line 9, with a shorter wiring length and correspondingly distributed in a region where the extending ends of the second data lines 6 are located, is designed to have a broken line shape matched with the shape of the extending end of each second data line 6. Therefore, on one hand, the first access lines 9 and the second data lines 6 are parallel to each other and do not intersect, so that signal crosstalk between the first access lines 9 and the second data lines 6 is improved or avoided; and on the other hand, each first access line 9 can be correspondingly distributed in the space between two adjacent second data lines 6, so that no additional space and area are needed on the display substrate for accommodating the first access lines 9.

In addition, it should be noted that when each first access line 9 has a straight line shape, a local line segment of each second data line 6 located in the same region as a portion of the first access line 9 having the straight line shape is also set to a straight line shape, so as to achieve the two technical effects described above. Further, the local broken line segment of each of the second data lines 6 that ensures the second data lines 6 have the same wiring resistance may be laid out in other regions, such as a local region of a binding wiring fan-out region at a binding side of the display substrate and close to the display region 101.

Figure 10:
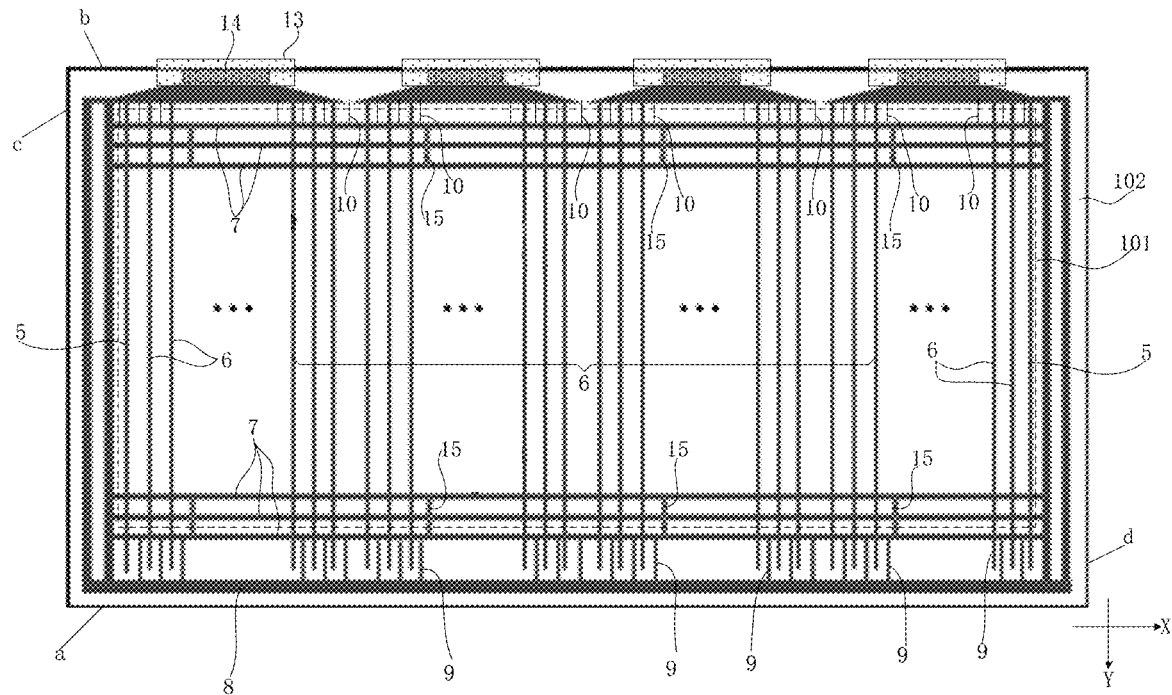
FIG. 10 is a top view of yet another circuit wiring of a display substrate according to an embodiment of the present disclosure.

In some implementations, referring to FIG. 10, a top view of yet another circuit wiring of a display substrate according to an embodiment of the present disclosure is shown. A plurality of second access lines 10 further extend from a portion of the common voltage bus 8 corresponding to a second side b of the display substrate, and the plurality of second access lines 10 are located in the frame region 102 and each connected to a common voltage line 7 adjacent thereto. The second side b of the display substrate, opposite to the first side a, is a side edge where starting ends of the first data lines 5 and the second data lines 6 are located. The plurality of second access lines 10 and the second data lines 6 are alternately distributed at intervals.

The common voltage bus 8 is located in the same layer as the plurality of second access lines 10. The plurality of second access lines 10 and the second data lines 6 are parallel to each other and equally spaced.

In some implementations, a line width of each second access line 10 is less than or equal to a line width of each second data line 6.

In some implementations, the number of the second access lines 10 is 1/N times the number of the second data lines 6, where N=1, 2, 3 . . . 12, and N is an integer.

In the present embodiment, as described above, by setting introduction points where the common voltage bus 8 introduces the common voltage signal to the common voltage lines 7 as a plurality of second access lines 10 with a thinner line width and uniformly arranged in a direction in which the second data lines 6 are arranged, compared with the introduction points where the common voltage bus 8 introduces the common voltage signal to the common voltage lines 7 in the related art, the number of the second access lines 10 in the present embodiment is much greater than the number of the introduction points in the related art. A width of each second access line 10 in the embodiment is much smaller than a width of the introduction point in the related art. Therefore, a strength of the local electric field at connection points of the second access lines 10 and the common voltage lines 7 is greatly reduced. In addition, since the second access lines 10 and the second data lines 6 are uniformly and alternatively distributed at equal intervals, and the difference between the second voltage difference of the dummy pixel 2 and the first voltage difference of the display pixel 1 is 0 or close to 0. Therefore, the phenomenon in which the local electric field at the connection points of the second access lines 10 and the common voltage lines 7 attracting ionic impurities in the display panel and causing gathering of the ionic impurities is greatly improved or avoided, so that the phenomenon in which the display pixels 1 at the connection points of the second access lines 10 and the common voltage lines 7 are blackened is improved or eliminated, the defect of black spot stains at the connection points of the second access lines 10 and the common voltage lines 7 is thus improved or avoided, and the display effect of the display substrate is improved.

In some implementations, each second access line 10 has a straight line shape (FIG. 10) or a broken line shape (not shown).

In some implementations, referring to FIG. 10, the display substrate further includes a plurality of flexible circuit boards 13. Each flexible circuit board 13 is provided with a data driving circuit 14 (i.e., data driving IC) connecting with the starting ends of the first data lines 5 and the second data lines 6; and the plurality of second access lines 10 are respectively located in a spacing region 13 between every two adjacent flexible circuit boards.

The plurality of second access lines 10 are divided into a plurality of groups each including multiple second access lines 10, and the multiple second access lines 10 in each group are dispersedly arranged in the spacing region between two adjacent flexible circuit boards 13. Compared with the related art where a wider block introduction electrode is separately provided in the spacing region between two adjacent flexible circuit boards 13, a strength of the local electric field at the connection points of the second access lines 10 and the common voltage lines 7 is greatly reduced in the present disclosure, the phenomenon in which the local electric field at the connection points of the second access lines 10 and the common voltage lines 7 attracting ionic impurities in the display panel and causing gathering of the ionic impurities is greatly improved or avoided, so that the phenomenon in which the display pixels 1 at the connection points of the second access lines 10 and the common voltage lines 7 are blackened is improved or eliminated, the defect of black spot stains at the connection points of the second access lines 10 and the common voltage lines 7 is improved or avoided, and the display effect of the display substrate is improved.

It should be noted that an alignment film is provided on a surface of the display substrate in contact with the liquid crystals, and an orientation of the alignment film is formed through a rubbing process. At present, a rubbing direction of the rubbing process is a rubbing orientation from the second side b to the first side a of the display substrate. In the related art where the pixel electrode and the common electrode of the dummy pixel are both input with the common voltage signal, the rubbing process may cause severe black line stains on other sides of the display substrate except the second side b, and severe black spot stains on the first side a of the display substrate, while the black line and black spot stains on the second side b of the display substrate are not obvious. Therefore, in some implementations, on the portion of the common voltage bus 8 corresponding to the second side b of the display substrate, the solution in the related art where a wider block introduction electrode is separately provided in the spacing region between two adjacent flexible circuit boards 13 may still be adopted for the purpose of introducing the common voltage signal into the common voltage lines 7 by the common voltage bus 8.

In some implementations, referring to FIGS. 8 to 10, the plurality of common voltage lines 7, the common voltage bus 8, the plurality of first access lines 9, and the plurality of second access lines 10 are located in a same layer. The plurality of common voltage lines 7 each extend to be connected to the common voltage bus 8 at both ends thereof. The first data lines 5 and the second data lines 6 are located in a same layer. The common voltage lines 7 and the second data lines 6 are located in different layers, and an insulation layer is provided therebetween. The display substrate further includes a plurality of common voltage jumper wires 15 uniformly distributed in the display region 101. The plurality of common voltage jumper wires 15 and the second data lines 6 are located in a same layer and parallel to each other. The plurality of common voltage jumper wires 15 each are connected to any two of the common voltage lines 7 through via holes in the insulation layer.

The plurality of common voltage lines 7 extend along the row direction X of the array, and are distributed in the display region 101 in parallel. Each common voltage line 7 is located at a side of a row of pixels close to the second side b of the display substrate, and is configured to provide a common voltage signal for the common electrodes of a row of pixels corresponding thereto. Each of the plurality of common voltage lines 7 further extends to be connected to the common voltage bus 8 surrounding the frame region 102 at both ends thereof, so that the common voltage bus 8 provides a common voltage signal to each common voltage line 7. By providing the common voltage jumper wire 15, it can ensure that the common voltage signal on the common voltage bus 8 can be more uniformly supplied to the common voltage lines 7 in the display region 101, so that the common voltage signal is consistent at any position point on each common voltage line 7, signal attenuation due to a too large distance that the common voltage signal passes on the common voltage line 7 is avoided, and the display effect of the display substrate is further ensured.

In some implementations, the flexible circuit board 13 is further provided with a common voltage driving circuit (i.e., a common voltage driving IC, not shown), which is connected to the common voltage bus 8 and configured to output a common voltage signal to the common voltage bus 8.

In this embodiment, the flexible circuit board 13 is a COF (Chip On Film) type. That is, the data driving circuit 14 and the common voltage driving circuit are both integrated on the flexible circuit board 13.

In some implementations, the flexible circuit board 13 may be a COG (Chip On Glass) type. That is, the data driving circuit (i.e., the data driving IC) and the common voltage driving circuit (i.e., the common voltage driving IC) are not integrated on the flexible circuit board, but are directly disposed in the frame region of the display substrate (e.g., a frame region at a binding side of the display substrate).

Figure 11:
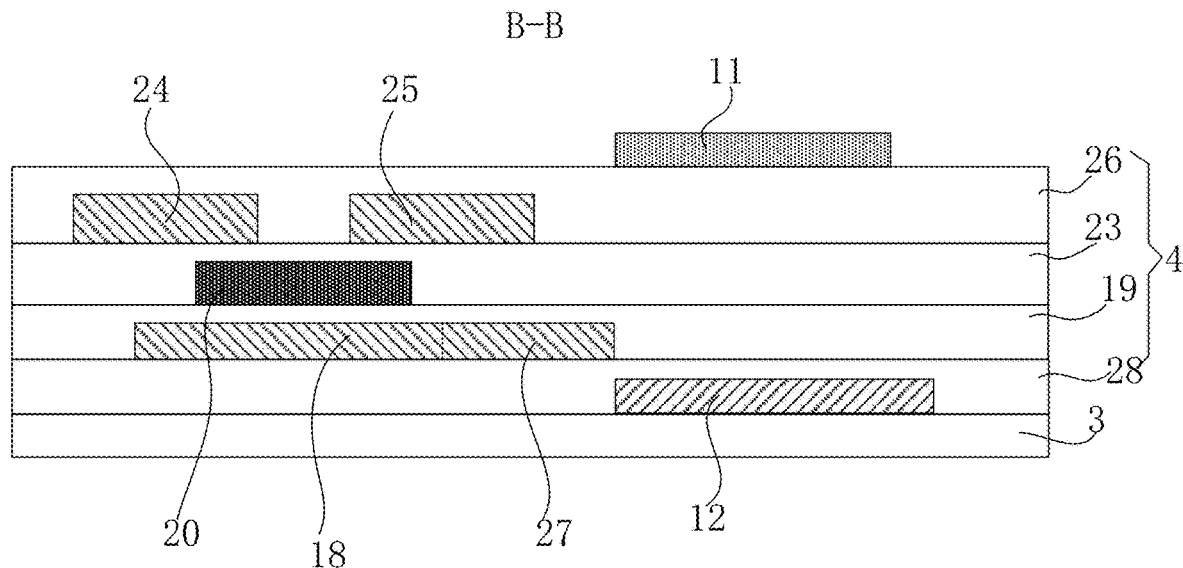
FIG. 11 is a structural sectional view of the display substrate in FIG. 4 taken along line BB according to an embodiment of the present disclosure.

In some implementations, referring to FIG. 11, a structural sectional view of the display substrate in FIG. 4 taken along line BB according to an embodiment of the present disclosure is shown. The display substrate further includes a pixel circuits configured to drive the display pixels 1 and the dummy pixels 2 to display, and formed by connecting a capacitor and a plurality of transistors, which is not described in detail here. Each transistor includes a gate 18, a gate insulation layer 19, an active layer 20, a second insulation layer 23, a source 24 and a drain 25 sequentially arranged on the base 3. The source 24, the drain 25, the first data lines 5 and the second data lines 6 are located in a same layer. A third insulation layer 26 is further provided on a side of the source 24 and the drain 25 away from the base 3, and the first pixel electrode 11 and the second pixel electrode are provided on a side of the third insulation layer 26 away from the base 3.

In some implementations, referring to FIGS. 4 and 11, the display substrate further includes a plurality of scanning lines 27 each correspondingly located at a side of each row of pixels close to the first side a of the display substrate, and configured to provide a scanning signal to each row of pixels for display. The gate 18, the plurality of scanning lines 27, and the plurality of common voltage lines are located in a same layer and parallel to each other. The first common electrode 12 and the second common electrode are located on a side of the gate 18 close to the base 3, and a fourth insulation layer 28 is provided between the first common electrode 12, the second common electrode, which are in the same layer, and the gate 18. In this embodiment, the fourth insulation layer 28, the gate insulation layer 19, the second insulation layer 23, and the third insulation layer 26 together form the first insulation layer 4 between the first common electrode 12 and the second common electrode 22 in the same layer and the first pixel electrode 11 and the second pixel electrode 21 in the same layer in FIG. 5.

It should be noted that the sequence of the film layers in the display substrate is not limited to the above, and is not listed here.

Figure 12:
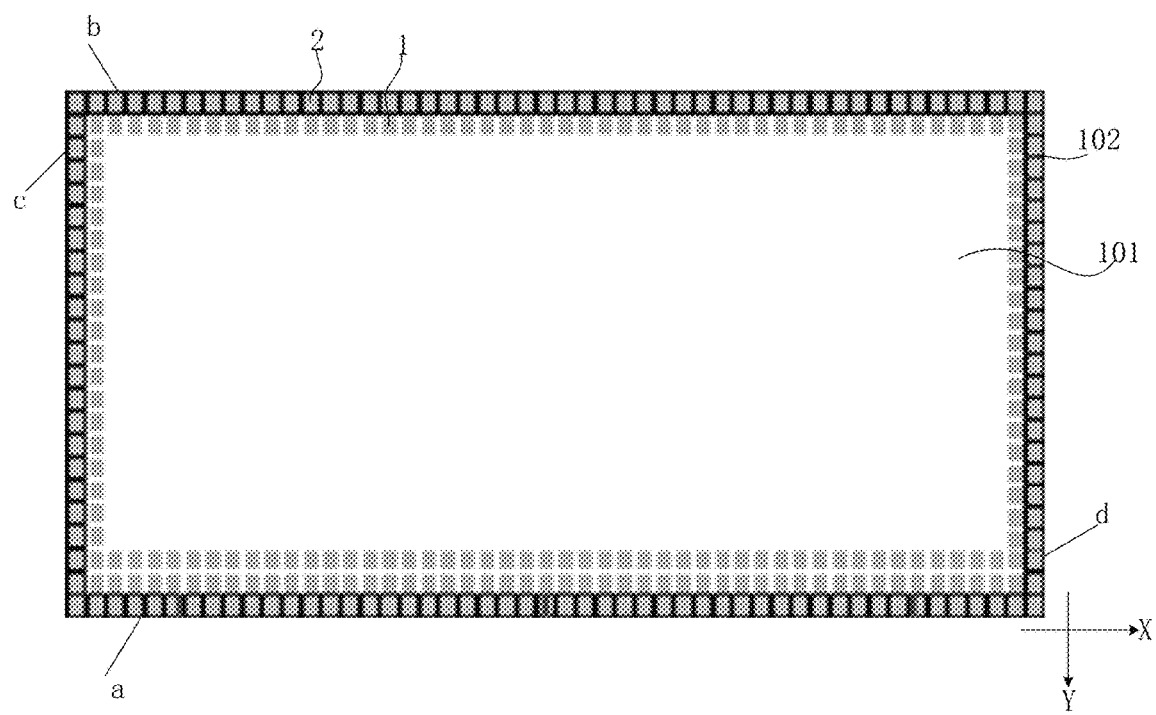
FIG. 12 is a schematic diagram showing an arrangement of pixels of a display substrate according to an embodiment of the present disclosure.

In some implementations, referring to FIG. 12, a schematic diagram showing an arrangement of pixels of a display substrate according to an embodiment of the present disclosure is shown. The display substrate further includes a third side c and a fourth side d opposite to each other and each extending in the column direction Y of the array. The first side a and the second side b of the display substrate each extend in the row direction X of the array. The third side c and the fourth side d are connected to the first side a and the second side b respectively to form an edge of the display substrate. The dummy pixels 2 are sequentially arranged for at least one circle along the edge of the display substrate.

In some implementations, the dummy pixels 2 are sequentially arranged for one to three circles along the edge of the display substrate. The dummy pixels have a same film layer structure as the display pixels 1, and by arranging the dummy pixels 2 for one to three circles, the step in the film layer at the periphery of the display region 101 can be effectively improved, so that the displayed patterns at the border between the display region 101 and the frame region 102 tends to be uniform, and the display effect is improved.

In this embodiment, the dummy pixels 2 are sequentially arranged for one circle along the edge of the display substrate.

In some implementations, each dummy pixel 2 has a same opening shape as, or a similar opening shape to, each display pixel 1. With such arrangement, the step in the film layer at the periphery of the display region 101 can be further improved, so that the displayed patterns at the border between the display region 101 and the frame region 102 tends to be uniform, and the display effect is improved.

The following verification experiments are designed based on the scheme in which the display pixels and the dummy pixels are connected to driving signals in the display panel of the related art and the scheme in which the display pixels and the dummy pixels are connected to driving signals in the display substrate according to an embodiment of the present disclosure.

Figure 13:
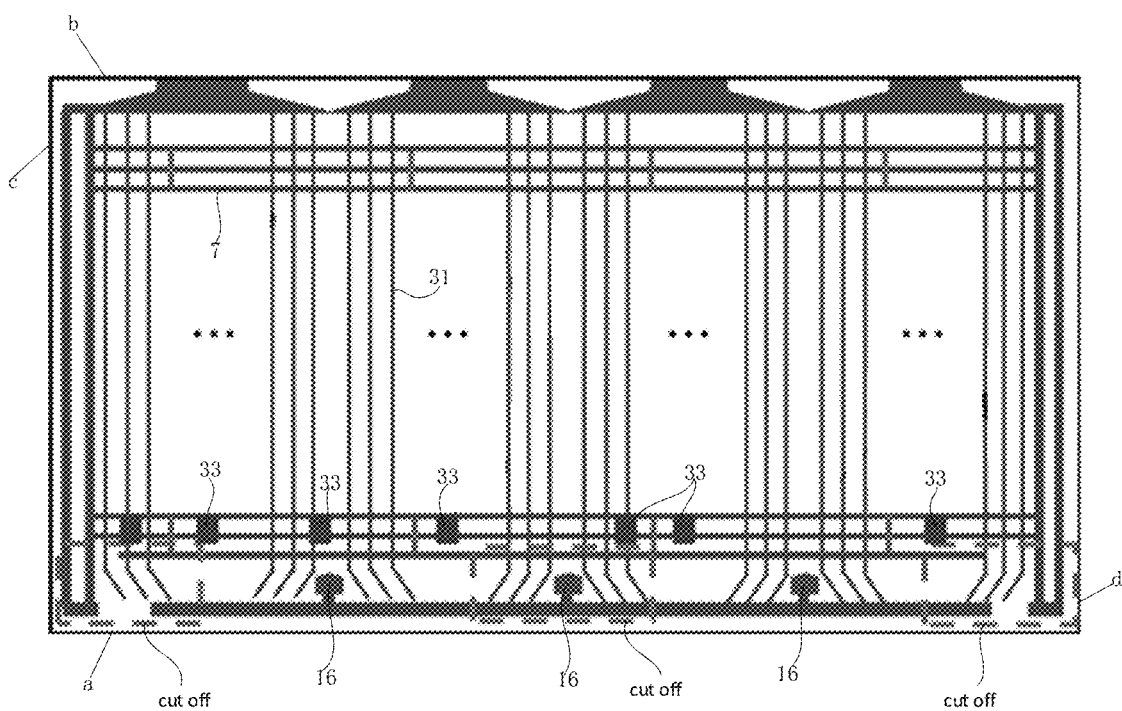
FIG. 13 is a schematic diagram showing a verification scenario of a first verification experiment.

In a first verification experiment, referring to FIG. 13, based on the scheme in which the display pixels and the dummy pixels are applied with driving signals in the liquid crystal display panel shown in FIG. 1, a schematic diagram of black stains at the periphery of the display substrate after cutting off the common voltage introduction points 16 on the first side a of the display substrate is shown. In the verification experiment, the connection between the common voltage introduction points 16 at the first side a of the display substrate, the second pixel electrodes and the second common electrodes of the dummy pixels distributed on the third side c and the fourth side d of the display substrate and the common voltage lines is cut off. At this time, the common voltage is uniformly distributed between the dummy pixels, and no local strong electric field is generated; and larger black spot stains gathered at the common voltage introduction points 16 disappear. However, the difference between the second voltage difference of each dummy pixel and the first voltage difference of each display pixel still exists, and black linear stains at the periphery region of the display substrate still exists, while local smaller black spot stains 33 at the periphery region of the display substrate are reduced and have random locations.

Figure 14:
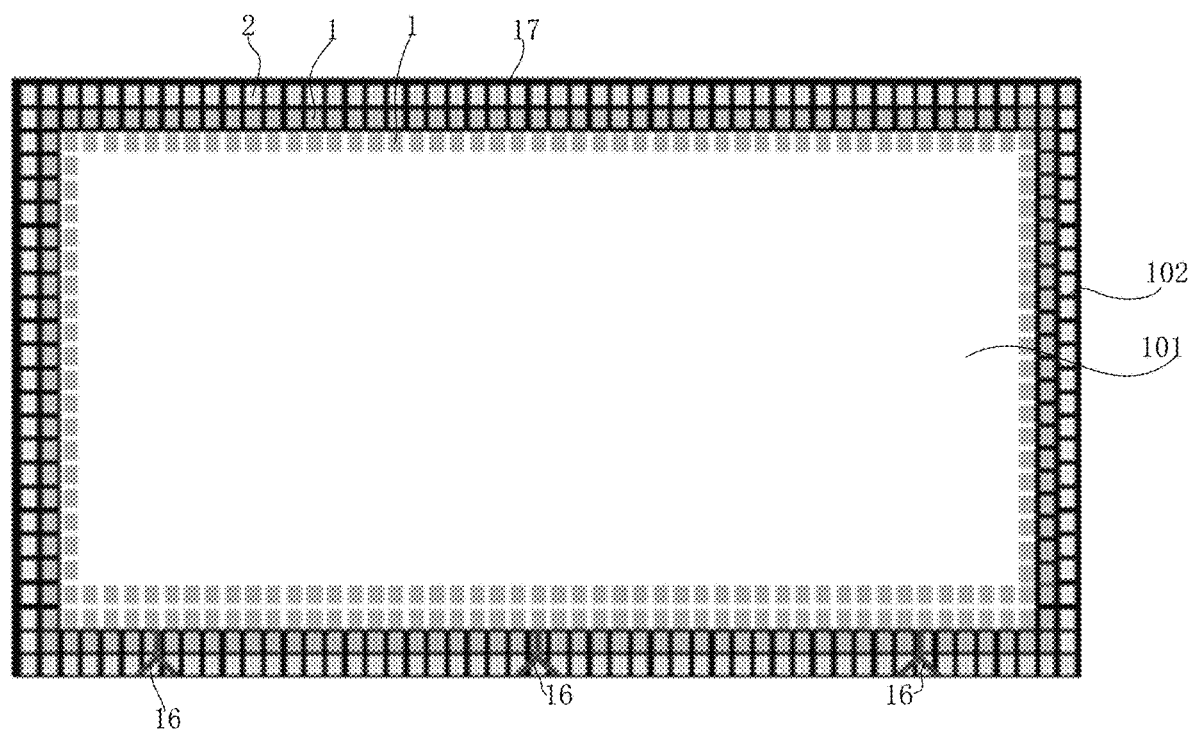
FIG. 14 is a schematic diagram showing a verification scenario of a second verification experiment.

In a second verification experiment, referring to FIG. 14, respectively based on the scheme in which the display pixels and the dummy pixels are connected to driving signals in the liquid crystal display panel of FIG. 1 and the scheme in which the display pixels and the dummy pixels are connected to driving signals in the display substrate of FIG. 4 according to an embodiment of the present disclosure, a schematic diagram of a high temperature reliability experiment performed after expanding a black matrix 17 covering the frame region 102 of the display substrate towards the display region 101 to cover a row of display pixels 1 at an outermost peripheral edge of the display region 101 is shown. The experimental result shows that no black stain is generated at the periphery region of the display substrate. In the scheme of FIG. 1, the black stains at the periphery region of the display substrate actually exist, but are blocked by the black matrix and cannot be seen. In the scheme of FIG. 4, since the second voltage difference of the dummy pixels 2 is consistent with the first voltage difference of the display pixels 1 in a row closest to the dummy pixels 2, the black stains at the periphery region of the display substrate are actually eliminated, as such, the black stains are not visible when blocked by the black matrix.

Figure 15:
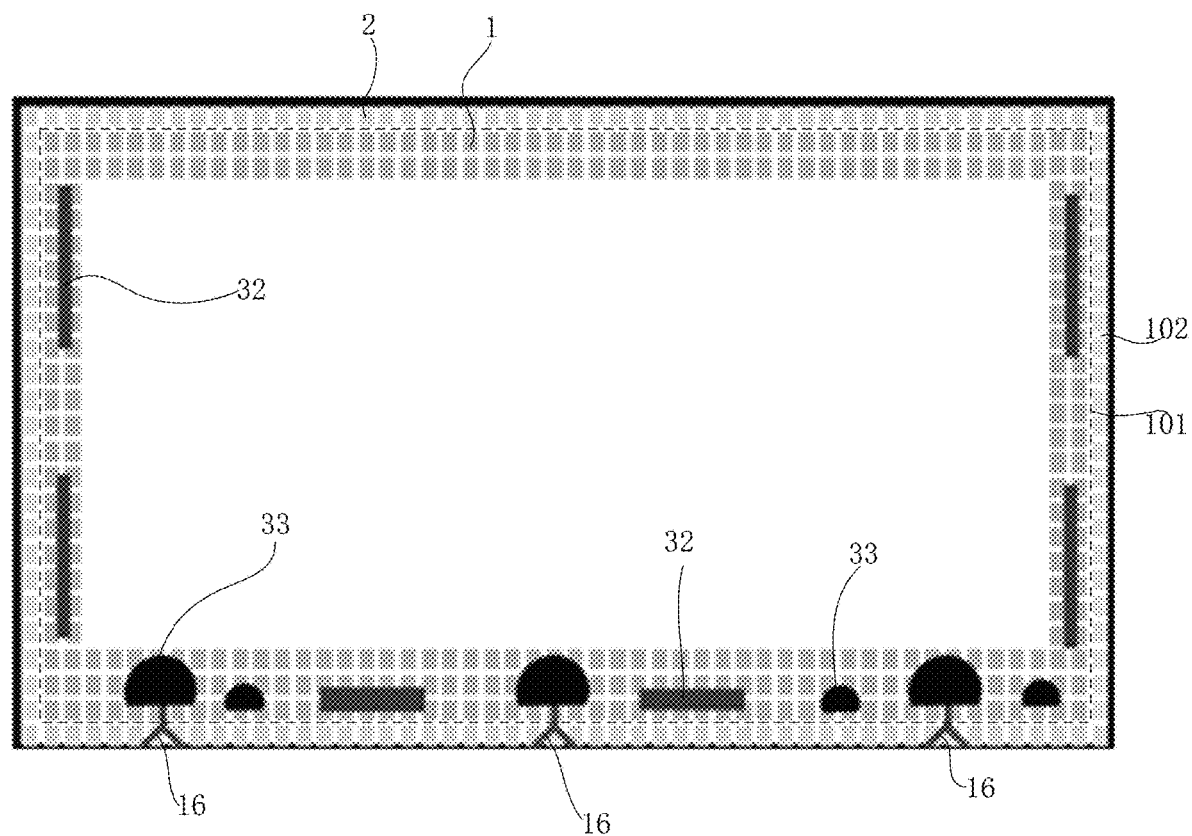
FIG. 15 is a schematic diagram showing a verification scenario of a third verification experiment.

In a third verification experiment, respectively based on the scheme in which the display pixels and the dummy pixels are connected to driving signals in the liquid crystal display panel of FIG. 1 and the scheme in which the display pixels and the dummy pixels are connected to driving signals in the display substrate of FIG. 4 according to an embodiment of the present disclosure, the black matrix covering the frame region 102 of the display substrate in FIG. 14 is removed. Referring to FIG. 15, based on the scheme in which the display pixels and the dummy pixels are connected to driving signals in the liquid crystal display panel shown in FIG. 1, a schematic experimental diagram after the black matrix covering the frame region 102 of the display substrate in FIG. 14 is removed is shown. When the black matrix in the scheme of FIG. 1 is removed, the black spot stains 33 and the black line stains 32 still exist in the periphery region of the display substrate. However, when the black matrix in the scheme of FIG. 4 is removed, the black spot stains and the black line stains in the periphery region of the display substrate are not visible. Therefore, it can be excluded that the disappearance of the black stains in the periphery region of the display substrate in FIG. 14 is not caused by blocking with the black matrix. Therefore, it is proved that the disappearance of the black stains in the periphery region of the display substrate is an effect that is not obtained by blocking with the black matrix, but is obtained by that the second voltage difference of the dummy pixels 2 is with the same as the first voltage difference of the display pixels 1 in a row closest to the dummy pixels 2, so that there is no strong local electric field at the periphery of the display substrate to cause the ionic impurities to gather.

Figure 16:
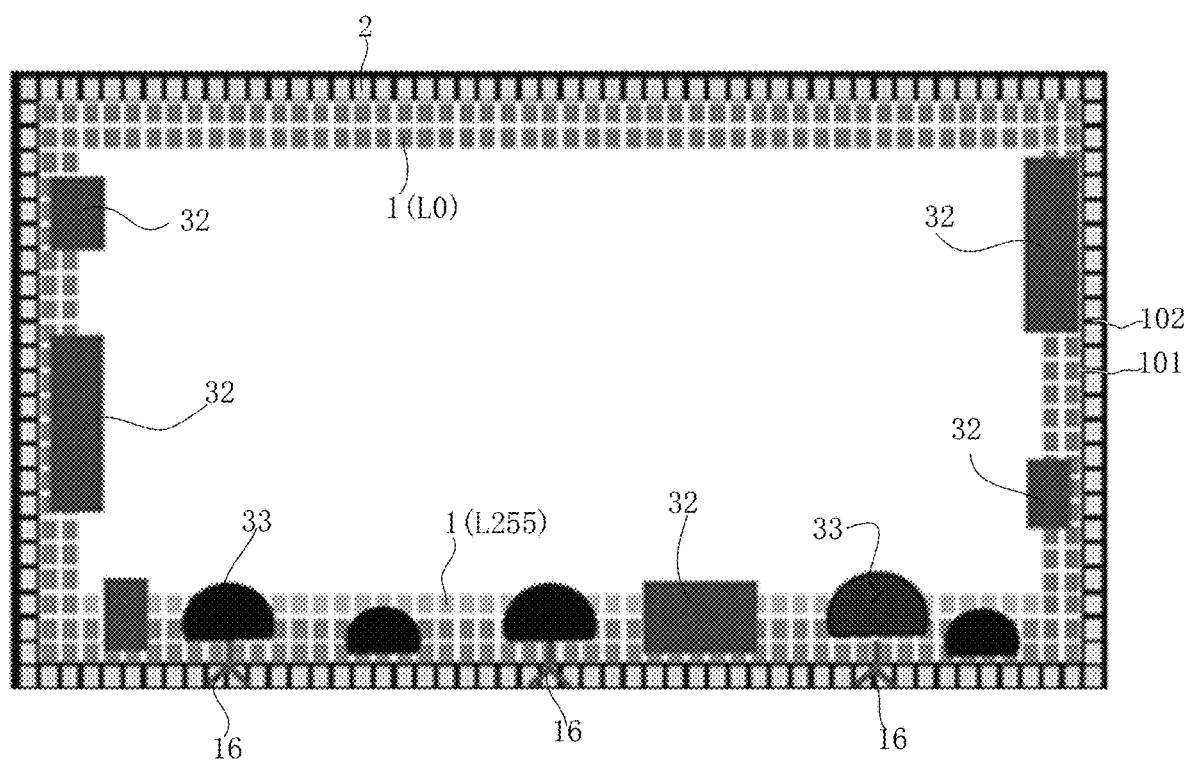
FIG. 16 is a schematic diagram showing a verification scenario of a fourth verification experiment.

In a fourth verification experiment, referring to FIG. 16, based on the scheme in which the display pixels and the dummy pixels are connected to driving signals in the liquid crystal display panel shown in FIG. 1, a schematic experimental diagram in which a data signal of 0 grayscale (i.e., L0) is inputted to the pixel electrodes of the two rows of display pixels 1 at the outermost peripheral edge of the display region 101, and a data signal of 255 normal grayscales (i.e., L255) is inputted to the pixel electrodes of the rest display pixels 1 in the display region 101 is shown. In this case, the voltage of the data signal on the pixel electrodes of the two rows of display pixels 1 at the outermost peripheral edge of the display region 101 is the same as the voltage of the data signal on the pixel electrodes of the dummy pixels 2, so that the region where the dummy pixels 2 in the periphery region of the display region 101 and the rest normal display pixels 1 in the display region 101 have a voltage difference therebetween is larger. The reliability experiment result shows that the black stains in the periphery region of the display substrate are aggravated, specifically, the black line stains 32 are widened, and the black spot stains 33 are enlarged. The experiment result can reversely prove effectiveness of the technical solution according to the embodiment of the present disclosure in improving or eliminating black stains in the periphery region of the display substrate.

According to the display substrate in the embodiments of the present disclosure, by setting the difference between the first voltage difference and the second voltage difference to be less than the set value, a voltage difference between the display pixel and the dummy pixel is prevented, and thus the strong local electric field will not be generated when the display substrate is subjected to the high temperature reliability experiment. Therefore, the gathering of the ionic impurities caused by the strong local electric field attracting the ionic impurities in the display substrate is avoided, the high temperature line stains caused by abnormal deflection of liquid crystals at positions where the ionic impurities are gathered in the display substrate is prevented, and the display effect of the display substrate is improved.

An embodiment of the present disclosure further provides a display panel, including the display substrate in any one of the above embodiments.

In some implementations, the display panel further includes an opposite substrate, which is aligned and assembled with the display substrate to form a cell with a cell gap therebetween, where the cell gap is filled with negative liquid crystals therein. The negative liquid crystals can improve transmittance of a high-resolution (such as 8K, i.e., 7680*4320) display panel, thereby improving the display brightness of the display panel.

In some implementations, the opposite substrate includes a black matrix covering the frame region of the display substrate.

By adopting the display substrate in any of the above embodiments, the defect of black stains in the periphery region of the display panel can be avoided, and the display effect of the display panel can be improved.

An embodiment of the present disclosure further provides a display apparatus, including the display panel in any one of the above embodiments.

By adopting the display apparatus in any one of the above embodiments, the defect of black stains in the periphery region of the display apparatus can be avoided, and the display effect of the display apparatus can be improved.

The display apparatus may be any product or component having a display function, such as an LCD panel, an LCD television, a mobile phone, a tablet, a laptop, a monitor, a digital frame, a navigator or the like.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A display substrate, having a display region and a frame region, wherein
the display substrate comprises a plurality of display pixels and a plurality of dummy pixels; the display pixels are distributed in the display region; the dummy pixels are distributed in the frame region; and the plurality of display pixels and the plurality of dummy pixels are arranged in an array;
each display pixel comprises a first pixel electrode and a first common electrode; and a first voltage difference exists between the first pixel electrode and the first common electrode;
each dummy pixel comprises a second pixel electrode and a second common electrode; and a second voltage difference exists between the second pixel electrode and the second common electrode; and
a difference between the first voltage difference and the second voltage difference is less than a set value,
the display substrate further comprises: a plurality of second data lines each extending in a row direction of the array, and first pixel electrodes of the display pixels a same column are connected to a same one of the second data lines; a plurality of common voltage lines each extending in a column direction of the array; and a common voltage bus located in the frame region and surrounding the display region, wherein
a plurality of first access lines extend from a portion of the common voltage bus corresponding to a first side of the display substrate, and the plurality of first access lines are located in the frame region and each connected to one of the common voltage lines adjacent thereto;
the first side of the display substrate is a side edge where extending ends of the first data lines and the second data lines are located; and
the plurality of first access lines and the second data lines are alternately distributed at intervals.

2. The display substrate according to claim 1, further comprising at least two first data lines each extending in a column direction of the array;
the dummy pixels comprise first type pixels;
the first type pixels are in different columns from the display pixels;
second pixel electrodes of the first type pixels a same column are connected to a same one of the first data lines;
a data signal input to any one of the first data lines is the same as a data signal input to one of the second data lines adjacent to the any one of the first data lines.

3. The display substrate according to claim 2, wherein the dummy pixels further comprise second type pixels in a column where the display pixels are located; and
for the second type pixels and the display pixels in a same column, second pixel electrodes of the second type pixels and the first pixel electrodes of the display pixels are connected to a same one of the second data lines.

4. The display substrate according to claim 3, wherein
for the display pixels and the dummy pixels in a same row, first common electrodes of the display pixels and second common electrodes of the dummy pixels are connected to a same one of the common voltage lines;
the second common electrodes of the dummy pixels in a same row are connected to a same one of the common voltage lines; and
a same common voltage signal is input to each of the plurality of common voltage lines.

5. The display substrate according to claim 3, wherein
the first common electrodes of the display pixels in a same row are connected to a same one of the common voltage lines; and
the second common electrodes of the dummy pixels are suspended; and
a same common voltage signal is input to each of the plurality of common voltage lines.

6. The display substrate according to claim 1, further comprising at least two first data lines, wherein the first data lines each extend in a column direction of the array;
the dummy pixels comprise first type pixels and second type pixels;
the first type pixels are in a different column from the display pixels; and the second type pixels are in columns where the display pixels are located;
second pixel electrodes of the first type pixels in a same column are connected to a same one of the first data lines that is connected to one of the common voltage lines;
first pixel electrodes of the display pixels in a same column are connected to a same one of the second data lines;
second pixel electrodes of the second type pixels in a same row are connected to a same one of the common voltage lines;
first common electrodes of the display pixels in a same row are connected to a same one of the common voltage lines;
a same common voltage signal is input to each of the plurality of common voltage lines; and
the second common electrodes of the first type pixels and the second type pixels are suspended.

7. The display substrate according to claim 1, wherein a plurality of second access lines further extend from a portion of the common voltage bus corresponding to a second side of the display substrate, and the plurality of second access lines are located in the frame region and each connected to one of the common voltage lines adjacent thereto;
the second side of the display substrate, opposite to the first side of the display substrate, is a side edge where starting ends of the first data lines and the second data lines are located; and
the plurality of second access lines and the second data lines are alternately distributed at intervals.

8. The display substrate according to claim 7, further comprising a plurality of flexible circuit boards; wherein each flexible circuit board is provided with a data driving circuit connecting with the starting ends of the first data lines and the second data lines; and the plurality of second access lines are each located in a spacing region between every two adjacent flexible circuit boards.

9. The display substrate according to claim 8, wherein a line width of each first access line is less than or equal to a line width of each second data line; and a line width of each second access line is less than or equal to the line width of each second data line.

10. The display substrate according to claim 9, wherein each first access line has a straight line shape or a broken line shape; and each second access line has a straight line shape or a broken line shape.

11. The display substrate according to claim 4, wherein an opening area of each dummy pixel is ½, ⅔, or ⅘ times an opening area of each display pixel.

12. The display substrate according to claim 7, wherein the display substrate further comprises a third side and a fourth side opposite to each other and each extending in the column direction of the array;

the first side and the second side each extend in the row direction of the array;

the third side and the fourth side are connected to the first side and the second side respectively to form an edge of the display substrate; and the dummy pixels are sequentially arranged for at least one circle along the edge of the display substrate.

13. The display substrate according to claim 1, further comprising a base, the first common electrode and the first pixel electrode are located in different layers above the base and mutually overlapped;

the second common electrode and the second pixel electrode are located in different layers above the base and mutually overlapped;

the first common electrode and the second common electrode are located in a same layer; the first pixel electrode and the second pixel electrode are located in a same layer;

the first pixel electrode and the second pixel electrode are farther away from the base than the first common electrode and the second common electrode; and the first pixel electrode and the second pixel electrode are both slit electrodes; and the first common electrode and the second common electrode are both plate electrodes.

14. The display substrate according to claim 7, wherein the plurality of common voltage lines, the common voltage bus, the plurality of first access lines, and the plurality of second access lines are in a same layer;

the plurality of common voltage lines each extend to be connected to the common voltage bus at both ends thereof;

the first data lines and the second data lines are located in a same layer;

the common voltage lines and the second data lines are located in different layers, and an insulation layer is provided therebetween;

the display substrate further comprises a plurality of common voltage jumper wires uniformly distributed in the display region; and the plurality of common voltage jumper wires and the second data lines are located in a same layer and parallel to each other; and the plurality of common voltage jumper wires each connects any two of the common voltage lines with each other through via holes in the insulation layer.

15. A display panel, comprising the display substrate according to claim 1.

16. The display panel according to claim 15, further comprising an opposite substrate, which is aligned and assembled with the display substrate to form a cell gap therebetween, wherein the cell gap is filled with negative liquid crystals.

17. A display apparatus, comprising the display panel according to claim 15.

* * * * *